(12) United States Patent
Banerjee

(10) Patent No.: US 6,647,261 B1
(45) Date of Patent: Nov. 11, 2003

(54) IDLE HANDOFF METHOD TAKING INTO ACCOUNT CRITICAL SYSTEM JOBS

(75) Inventor: Debarag Narayan Banerjee, Milpitas, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 521 days.

(21) Appl. No.: 09/619,983

(22) Filed: Jul. 20, 2000

(51) Int. Cl.$^7$ ................................. H04Q 7/20
(52) U.S. Cl. ............... 455/436; 455/437; 455/442; 455/443; 370/331
(58) Field of Search ............... 455/432, 434, 455/435–440, 442, 443, 444, 450, 403, 422, 509; 370/320, 331, 332, 333, 335, 342, 441, 310, 319

(56) References Cited

U.S. PATENT DOCUMENTS

| | | | |
|---|---|---|---|
| 5,182,750 A * | 1/1993 | Bales et al. | 370/384 |
| 5,857,154 A | 1/1999 | Laborde et al. | 455/444 |
| 5,949,776 A | 9/1999 | Mahany et al. | 370/338 |
| 6,101,395 A * | 8/2000 | Keshavachar et al. | 455/466 |
| 6,178,164 B1 * | 1/2001 | Wang et al. | 370/331 |
| 6,195,551 B1 | 2/2001 | Kim et al. | |
| 6,320,855 B1 * | 11/2001 | Shi | 370/332 |
| 2002/0027891 A1 * | 3/2002 | Mimura | 370/331 |
| 2002/0142776 A1 * | 10/2002 | Tiedemann, Jr. | 455/450 |
| 2002/0191583 A1 * | 12/2002 | Harris et al. | 370/345 |
| 2003/0002525 A1 * | 1/2003 | Grilli et al. | 370/465 |
| 2003/0064724 A1 * | 4/2003 | Park | 455/436 |

FOREIGN PATENT DOCUMENTS

| | | | |
|---|---|---|---|
| JP | 11113042 | 4/1999 | |
| WO | 95/05055 | 2/1995 | H04Q/7/38 |
| WO | 96/13946 | 5/1996 | H04Q/7/00 |
| WO | 99/40745 | 8/1999 | H04Q/7/32 |
| WO | 00/11879 | 3/2000 | |

OTHER PUBLICATIONS

"Comparison of cell search methods for asynchronous wideband CDMA cellular system" Nystrom, J.; Jamal, K.; Wang, Y.–P.E.; Esmailzadeh, R.; Universal Personal Communications, 1998. ICUPC '98. IEEE 1998 International Conference on , vol.: 2, 5–9 Oct. 1.*

TIA/EIA–98–C Standard Document, TR45–Recommended Minimum Performance Standards for Dual–Mode Spread Spectrum Mobile Stations , Jun. 16, 1999, Section 3, pp. 3–1 to 3–32.

* cited by examiner

*Primary Examiner*—Nay Maung
*Assistant Examiner*—Edan Orgad
(74) *Attorney, Agent, or Firm*—Michael Schmitt

(57) ABSTRACT

A cellular radio communication system has a number of cells covered by base stations communicating with mobile communication devices. The mobile communication device performs an idle handoff method. In the idle handoff method, the communication mobile device receives paging messages from a first base station, and initiates idle handoff from the first base station to a second base station if it is established that no other, critical idle-mode process with the first base station is being performed.

18 Claims, 5 Drawing Sheets

IDLE HANDOFF METHOD TAKING INTO ACCOUNT CRITICAL SYSTEM JOBS

BACKGROUND OF THE INVENTION

1. Field of the Invention

The present invention relates to an idle-mode handoff method in a mobile communication device that is comprised in a cellular radio communication system with base stations, such an idle-mode handoff method being an autonomous handoff method with no involvement of base stations.

2. Description of the Related Art

Cellular radio communication systems are well-known. Such cellular radio communication systems comprise cells or radio zones, together covering a given geographical area. The cells include base stations that, through control and communication channels, establish and maintain communication links with mobile communication devices that are comprised in the cellular radio communication system, and communicate with the mobile communication devices through established communication links.

One type of a cellular radio communication system is a CDMA (Code Division Multiple Access) System as described in the TIA/EIA-98-C Standards document "TR45 —Recommended Minimum Performance Standards for Dual-Mode Spread Spectrum Mobile Stations", Jun. 16, 1999. In such a system, but also in other systems, radio base stations may communicate with mobile communication devices using slotted mode transmission and reception. Section 3, pp. 3-1 to 3-32 of said Standards document describes CDMA receiver minimum standards, more particularly idle mode handoff processes that are autonomously performed by a mobile station or mobile communication device with no involvement of radio base stations, both for non-slotted and slotted mode transmission and reception. When in the mobile station idle state, in slotted mode, the mobile station searches for a strongest pilot channel signal on a current CDMA frequency assignment during the assigned slots. The mobile station determines that an idle handoff should occur when it detects a pilot channel signal sufficiently stronger than the one it is currently monitoring. The mobile station performs an idle handoff whenever $E_c/I_0$ of a pilot in the neighbor set, i.e., of a neighboring base station, exceeds the $E_c/I_0$ of a pilot in the active set, i.e., the current base station, by 3 dB, $E_c/I_0$ being the pilot strength, $E_c$ being the chip energy, and $I_0$ being interference. When in idle mode, the mobile station receives paging messages from a current base station to which it is synchronized, such paging messages being transmitted in slotted paging channels on a pilot signal. In between reception of paging messages, in order to save power, a mobile station adopts a sleep mode. In such a CDMA mobile station, a so-called searcher determines pilot signal strengths for resolved base station pilot signals, both for the active set and for the neighbor set. Idle handoff uses the determined pilot signal strengths to perform a handoff from the current base station to another base station.

In the PCT patent application WO 99/40745, in a mixed voice and data mobile radio system a call-mode handoff method is disclosed. When a mobile station transmits data to the system, handoff is blocked. Blocking is suspended after termination of the data call, or for after a predetermined time, e.g., after transmission of a whole fax page. The call-mode handoff method requires interaction between the mobile station and the system, i.e., is not autonomous.

SUMMARY OF THE INVENTION

It is an object to provide an idle-mode handoff method that avoids interruption of critical jobs in a mobile communication device that need system access.

It is an object of the invention to avoid unqualified blocking of handoffs.

It is another object of the invention to provide an idle-mode handoff method that avoids spurious handoffs due to artifacts in a pilot signal search process, thereby avoiding losing the system and a time consuming reacquisition process.

It is still another object of the invention to provide an idle-mode handoff method that avoids a mobile station to perform idle handoffs in a very rapid succession when being in a location with a number of strong pilots under fading propagation conditions, while performing a critical idle-mode process needing system access.

It is still another object of the invention to provide such an idle handoff that takes into account signal quality measures of pilot signals.

In accordance with the invention, in a mobile communication device comprised in a cellular radio communication system that further comprises a plurality of base stations, an idle-mode handoff method is provided, said method comprising:

receiving paging messages from a first base station; and initiating an idle-mode handoff process from said first base station to a second base station if it is established that no other idle-mode process with said first base station is being performed.

Other idle-mode processes can be registration or authorization tasks, or the like, requiring system access. The invention ensures that no critical other idle-mode task is interrupted.

Because unqualified blocking of handoffs in a given cell is avoided, the risk of losing the system or of dropped calls is greatly reduced. Particularly in a CDMA system, re-acquisition of the system is a time consuming process that should be avoided, firstly because it is annoying to the user of the mobile communication device, and secondly because it exhausts the battery of the mobile communication device.

Preferably, signal quality measures associated with paging signals, paging message error rates, are also taken into account. Herewith, a higher layer software process, at a software layer higher than the lower software layer that assists the idle handoff process in performing acquisition of the signal quality measures, is informed whether handoff is needed. Preferably, the acquired signal quality measures are provided to the higher layer software process through inter-process communication.

The signal quality measures may be determined in various ways, on the basis of paging message error rates, on the basis of elapsed time in terms of the number of successively received invalid paging messages before receiving a valid paging message, or on the basis of signal strength. The various methods provide a measure for link quality of the paging channels.

BRIEF DESCRIPTION OF THE DRAWING

Throughout the figures the same reference numerals are used for the same features.

DESCRIPTION OF THE DETAILED EMBODIMENTS

Figure 1:
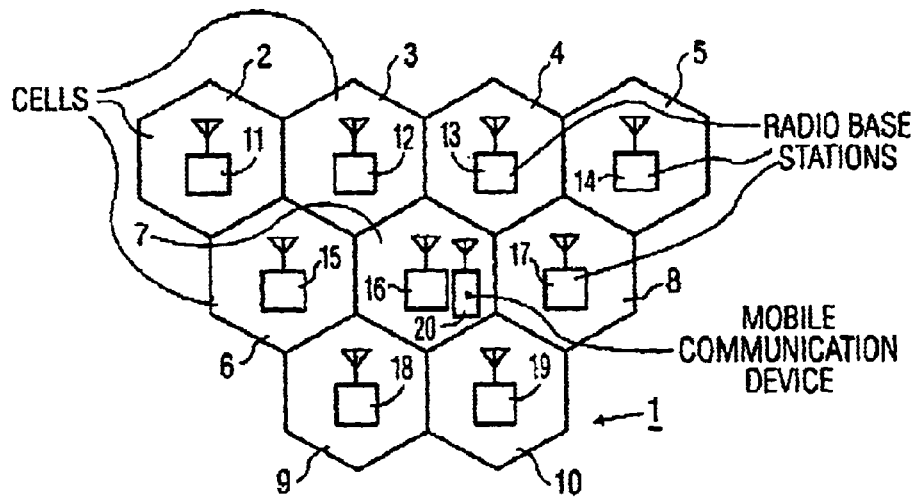
FIG. 1 schematically shows a cellular radio communication system according to the invention.

FIG. 1 schematically shows a cellular radio communication system 1 according to the invention. The system 1 comprises radio zones 2–10, each respectively comprising radio base stations 11–19. A mobile communication device 20 is comprised in the radio zone 7. The mobile communication device 20 may be a cell phone or handset, a PDA (Personal Digital Assistant) including a cell phone, or any other suitable mobile communication device. In the example given, the system 1 is a direct sequence spread spectrum CDMA system with slotted transmission and reception. Groups of radio base stations are coupled to switching centers (not shown), and the switching centers are coupled to each other. Such a cellular communication system 1, which may be a CDMA system as defined in said TIA-EIA-98-C Standard, is well known in the art. The mobile communication device 20 is configured to perform an autonomous idle handoff method according to the invention.

Figure 2:
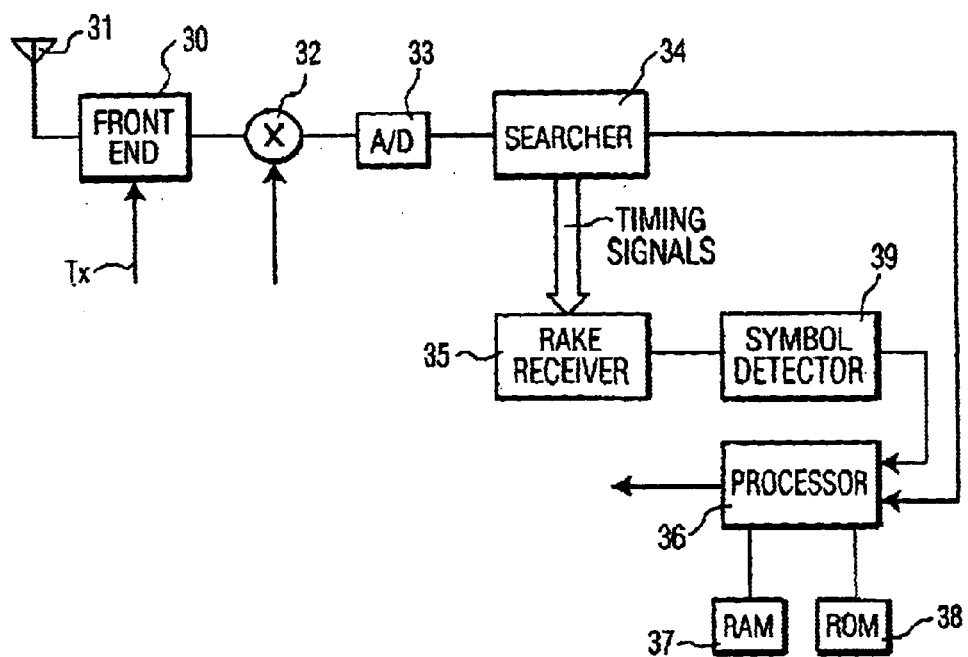
FIG. 2 shows a block diagram of a mobile communication device according to the invention.

FIG. 2 shows a block diagram of the mobile communication device 20 according to the invention. The mobile communication device 20 is a direct sequence spread spectrum CDMA device operating in idle mode and receiving paging messages from a radio base station comprised in the system 1. In between reception of paging messages that are transmitted in slots the device 20 adopts a sleep mode. In the example given, initially the device 20 is synchronized to the radio base station 16. The device 20 monitors a pilot signal on a paging channel of which the paging messages are transmitted. As shown in FIG. 1, the radio base stations 12, 13, 15, 17, 18, and 19 are neighboring base stations from which the device possibly receives pilot signals. The mobile communication device 20 comprises a radio transmission and reception front end 30 that is coupled to an antenna 31. A transmission branch is indicated by Tx. For the purpose of the invention only a reception branch is shown in more detail. The radio front end 30 is coupled to down-mixing means 32 so as to obtain a base band signal from a received radio frequency signal. The down-mixing means provides complex spread spectrum signals. For reasons of simplicity only a signal analog-to-digital converter 33 is shown for sampling the down-mixed spread spectrum signal. The device 20 further comprises programmed processing means for processing the sampled spread spectrum signal. In a CDMA mobile communication device 20 as shown such programmed processing means usually comprises a searcher 34 to resolve multi-path received signals and to provide timing signals to a multiple finger rake receiver 35, a processor 36, a RAM 37 to contain volatile data, and a programmed ROM 38. The rake receiver 35, that provides diversity combining, is coupled to a symbol detector 39. The processing means is programmed to perform an autonomous idle handoff method according to the invention.

Figure 3:
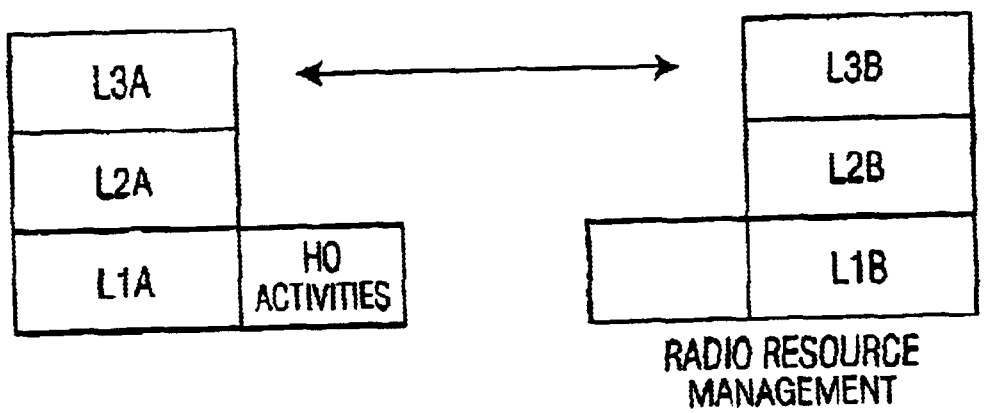
FIG. 3 shows a software layer model to illustrate the invention.

FIG. 3 shows a software layer model to illustrate the invention. Such a layer model is based upon the well-known OSI (Open Systems Interconnection) layer model, defining a lower physical layer, a higher data link layer, and still higher layers. From a logical point of view, layers defined upon physical entities such as terminals and networks perform a peer-to-peer communication with each other. From a physical point of view, within a physical entity, layers communicate with each other by passing so-called primitives. Shown are layers L1A, L2A, and L3A within the mobile communication device 20, and layers L1B, L2B, and L3B within the base station 16 that currently transmits paging messages to the mobile communication device 20. The layers L1A and L1B are so-called physical layers, the layers L2A and L2B are so-called data link layers, and the layers L3A and L3B are call control layers. At least part of the handoff activities, such as obtaining signal-to-noise ratios from the searcher 34, is performed as a L1A-software process. Call control layer software processes perform message processing such as registration to and authentication by the system 1. Such idle-mode registration and authentication processes are critical processes that should not be interrupted. Idle handoff is a layer three (L3A) software process performed by the mobile communication device 20. According to the invention, idle handoff establishes whether critical idle-mode processes are running in the mobile communication device 20, and, preferably, checks link quality before actually performing an idle-mode handoff.

Figure 4:
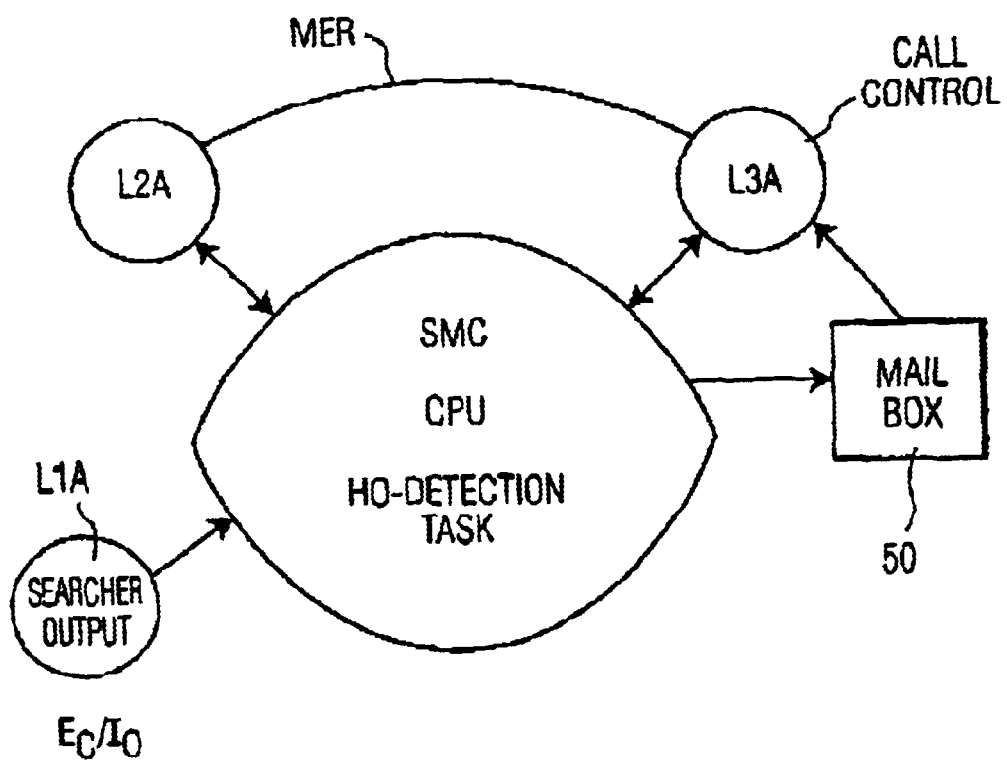
FIG. 4 is a processing diagram illustrating lower and higher layer software processes according to the invention.

FIG. 4 is a processing diagram illustrating lower and higher layer software processes according to the invention. Shown is Set Maintenance CPU (SMC) software communicating with the various layers L1A, L2A, and L3A, and exchanging messages between layers. The SMC performs a handoff detection task, and passes searcher output to the call control layer L3A through a software mail-box 50, i.e., through inter-process communication. Searcher output comprises pilot signal strengths $E_c/I_0$ of an active and a neighbor set. In addition of being provided with searcher output, the call control layer three software process queries layer L2A that provides signal quality measures that are characteristic of signals at a paging channel through which paging messages are transmitted to the mobile communication device 20. Such signal quality measures may be message error rates (MER) of paging signals, or other signal quality measures that are characteristic of a link such pilot signal strengths.

Figure 5:
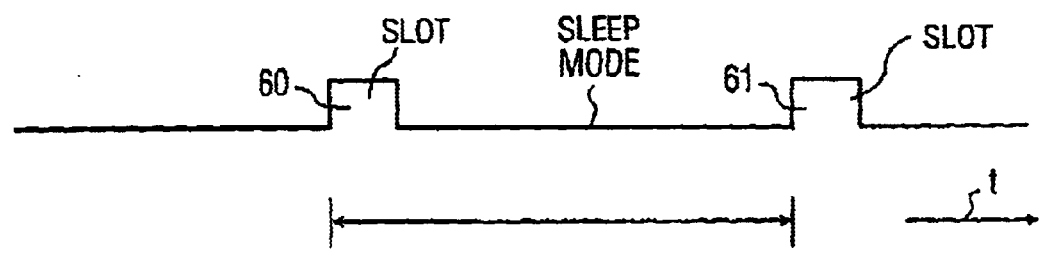
FIG. 5 illustrates slotted mode reception of paging signals.

FIG. 5 illustrates slotted mode reception of paging signals. Shown are slots 60 and 61 during which the mobile communication device receives paging messages from the system 1. In between reception of paging messages the mobile communication device adopts a sleep mode.

Figure 6:
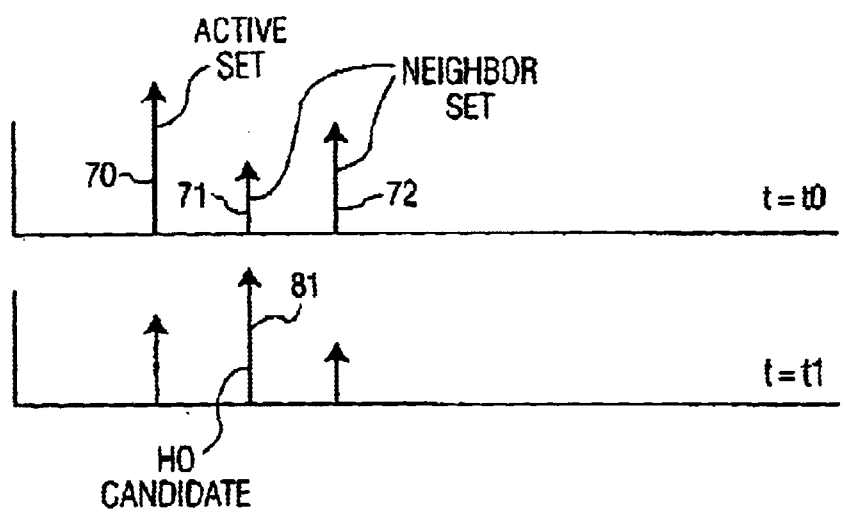
FIG. 6 shows acquisition of active and neighbor sets by a searcher according to the invention.

FIG. 6 shows acquisition of active and neighbor sets by a searcher 34 according to the invention. At an instant t=t0, the mobile communication device 20 is synchronized to the radio base station 16 currently providing the best pilot signal, the active set 70. The mobile communication device 20 receives paging messages from the radio base station 16. Further shown is a neighbor set 71 and 72 of pilot signals resolved by the searcher 34, from the radio base stations 17 and 19. At an instant t=t0, the searcher 34 provides $E_c/I_0$ from the base stations 16, 17, and 19, $E_c/I_0$ from the base station 17 being the best signal and thus a handoff candidate 81 possibly providing a better paging message error rate.

Figure 7:
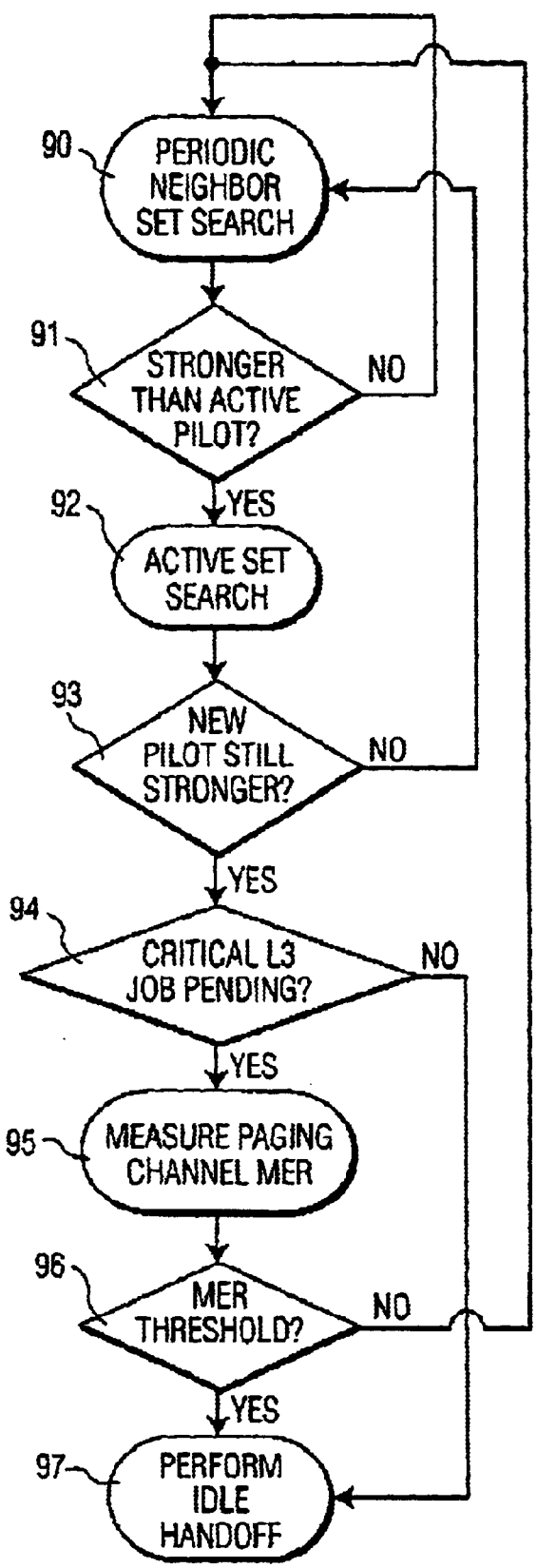
FIG. 7 is a flowchart to illustrate idle handoff according to the invention.

FIG. 7 is a flowchart to illustrate idle handoff according to the invention. In block 90, the searcher 34 periodically performs a neighbor set search. In block 91 it is tested whether a pilot signal in the neighbor set is stronger than the pilot signal of the active set. If this is not the case, returned is to the block 90. If so, in block 92 an active set search is performed. In block 93 it is tested whether a handoff candidate in the neighbor set is stronger than the pilot signal in the active set as acquired in block 92. If this is not the case, returned is to the block 90. If so, in block 94 it is tested whether a critical layer three job is pending. If this is the case, in block 95 the paging channel message error rate is determined and in block 96 the determined paging message error rate is tested against a threshold. If the paging message error rate is above the threshold, in block 97 idle handoff is performed to the base station of the acquired handoff candidate. Idle handoff is also performed if it had been established in block 94 that no critical layer three job was pending. If the determined paging message error rate is not above the threshold, returned is to the periodic neighbor set search. In CDMA systems usually no equalization is done so that the paging message error rate or bit error rate is a good link quality criterion. In other systems, signal strength might be a good link quality criterion.

Figure 8:
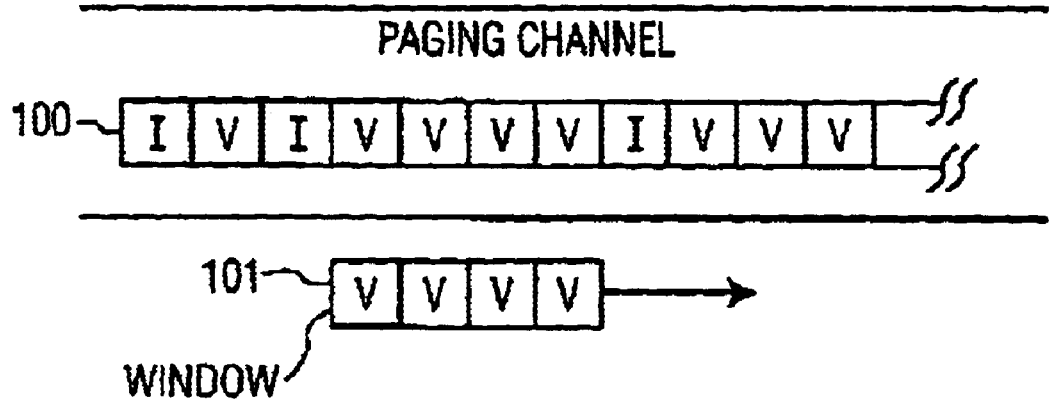
FIG. 8 shows a first embodiment of acquisition of signal quality measures determining handoff.

FIG. 8 shows a first embodiment of acquisition of signal quality measures determining handoff. Shown is a succession of received paging messages 100, valid paging messages being indicated by "V" and invalid paging messages being indicated by "I". Within a window 101, over a given period of time, a running average of valid and invalid paging message is kept on the basis of which the layer three software process determines whether the paging message error rate is above a given threshold. A ratio is defined on the window 101, the number of invalid messages over the sum of the number of valid messages added to the number of invalid messages (I/(I+V)). Shown is a ratio 0/(0+4)=0/4. With the window shifted one position to the right, the ratio changes to 1/(1+3)=1/4. The threshold could be 2/4, for instance.

Figure 9:
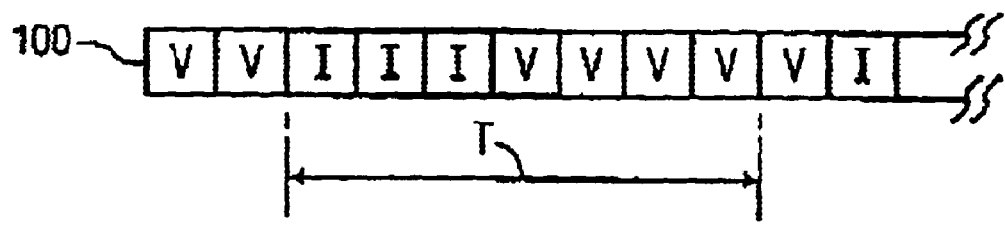
FIG. 9 shows a second embodiment of acquisition of signal quality measures determining handoff.

FIG. 9 shows a second embodiment of acquisition of signal quality measures determining handoff. In this embodiment, over a given interval T after having received a first invalid paging message immediately after an valid paging message it is determined whether such a condition of receiving invalid paging messages persists. The interval T can be measured by a timer that elapses. The closer the timer is to elapse while still receiving invalid paging messages, the greater the chance that the system will be lost and thus needs to be re-acquired. The threshold to determine link quality can be set as a percentage of elapsed time, for instance 50%. This is based on the insight that a "panic" handoff that interrupts a critical layer three task is still less disruptive than re-acquiring the system. In a CDMA system, re-acquiring the system is a time consuming task that may take 3–7 seconds.

In view of the foregoing it will be evident to a person skilled in the art that various modifications may be made within the spirit and the scope of the invention as hereinafter defined by the appended claims and that the invention is thus not limited to the examples provided. The word "comprising" does not exclude the presence of other elements or steps than those listed in a claim.

What is claimed is:

1. In a mobile communication device comprised in a cellular radio communication system that further comprises a plurality of base stations an idle-mode handoff method, said method comprising:
    operating a physical layer software process;
    operating a data link layer software process;
    operating a call control software process;
    receiving paging messages from a first base station; and
    determining, within the mobile communication device, whether a critical idle-mode process is running in the call control layer software process;
    initiating an idle-mode handoff process from said first base station to a second base station if the determination is affirmative.

2. A method as claimed in claim 1, further comprising
    determining a first signal quality measure that is characteristic of a first paging channel that is associated with said first base station, said paging messages being received through said first paging channel,
    determining a second signal quality measure that is characteristic of a second paging channel that is associated with said second base station, and
    actually performing said idle-mode process if it is established that said first signal quality measure is worse than a minimum quality to sustain a communication.

3. A method as claimed in claim 2, wherein said first and second signal quality measures are paging message error rates.

4. A method as claimed in claim 3, wherein said paging message error rates are determined as a running average over a given period of time.

5. A method as claimed in claim 2, wherein said first and second signal quality measures are determined on the basis of intervals between receiving valid paging signals and invalid paging signals over a given period of time.

6. A method as claimed in claim 2, wherein said first and second signal quality measures are signal strengths.

7. A method as claimed in claim 2, wherein said radio communication system is a code division multiple access system and said paging channels are slotted mode transmitted channels on respective pilot signals of said first and second base stations.

8. A method as claimed in claim 2, wherein said idle-mode handoff process comprises a lower layer software process, and said other idle-mode process, when being performed, is a higher layer software layer process, said lower layer software process acquires said first and second signal quality measures, and said higher layer software process initiates said idle mode handoff process on the basis of said acquired first and second signal quality measures.

9. A method as claimed in claim 8, wherein said higher layer software process retrieves said acquired first and second signal quality measures through inter-process communication.

10. A method as claimed in claim 8, wherein said higher layer software process is a call control process.

11. A method as claimed in claim 7, wherein said mobile communication device adopts a sleep mode between reception of said slotted mode transmitted channels.

12. A cellular radio communication system comprising:
    a plurality of cells having base stations covering said cells; and
    a mobile communication device comprising means for receiving paging messages from a first base station, and means for operating a physical layer software process; means for operating a data link layer software process; means for operating a call control layer software process; means for determining, within the mobile communication device, whether a critical idle-mode process is running in the call control layer software process; and
    means for initiating an idle-mode handoff process from said first base station to a second base station if the determination is affirmative.

13. A mobile communication device for use in a cellular radio communication system having a plurality of cells with base stations covering said cells, said mobile communication device comprising:
    means for receiving paging messages from a first base station; means for operating a physical layer software process; means for operating a data link layer software process; means for operating a call control layer software process; and means for initiating an idle-mode handoff process from said first base station to a second base station responsive to an affirmative determination by the means for determining.

14. A mobile communication device as claimed in claim 13, further comprising means for determining a first signal quality measure that is characteristic of a first paging channel that is associated with said first base station, said paging messages being received through said first paging channel, means for determining a second signal quality measure that is characteristic of a second paging channel that is associated with said second base station, and means for actually performing said idle-mode process if it is established that said first signal quality measure is worse than a minimum quality to sustain a communication.

15. A mobile communication device as claimed in claim 14, wherein said first and second signal quality measures are paging message error rates.

16. A mobile communication device as claimed in claim 15, said mobile communication device being configured to determine said paging message error rates as a running average over a given period of time.

17. A mobile communication device as claimed in claim 14, said mobile communication device being configured to determine said first and second signal quality measures on the basis of intervals between receiving valid paging signals and invalid paging signals over a given period of time.

18. A mobile communication device as claimed in claim 14, wherein said first and second signal quality measures are signal strengths.

* * * * *